United States Patent [19]

Wang

[11] Patent Number: 4,927,906

[45] Date of Patent: May 22, 1990

[54] NOVEL POLYAMIDEIMIDE POLYMERS

[75] Inventor: Pen C. Wang, Houston, Tex.

[73] Assignee: Shell Oil Company, Houston, Tex.

[21] Appl. No.: 284,872

[22] Filed: Dec. 15, 1988

[51] Int. Cl.$^5$ .................. C08G 12/00; C08G 69/26; C08G 63/08

[52] U.S. Cl. .................. 528/228; 528/220; 528/229; 528/342; 528/350; 528/354

[58] Field of Search .............. 528/220, 228, 229, 342, 528/350, 354

[56] References Cited

U.S. PATENT DOCUMENTS

| | | | |
|---|---|---|---|
| 4,314,047 | 5/1982 | White et al. | 528/21 |
| 4,330,666 | 5/1982 | White et al. | 528/207 |
| 4,362,863 | 12/1982 | Kojima et al. | 528/353 |
| 4,398,021 | 8/1983 | St. Clair et al. | 528/222 |
| 4,489,027 | 12/1984 | St. Clair | 264/137 |

OTHER PUBLICATIONS

Kurita et al., J. Polymer Sci: Polymer Chem Ed., vol. 16, pp. 779-789 (1978).
Gang et al., J. Polymer Sci: Polymer Chem. Ed., vol. 17, pp. 3255-3271 (1979).

Primary Examiner—John Kight, III
Assistant Examiner—T. Mosley

[57] ABSTRACT

Novel polymers containing amide and imide moieties are produced by reaction of a spirodilactam precursor selected from 4-oxoheptanedioic acid compounds or 1,6-dioxa [4,4] spirodilactones, a primary diamine and an aromatic tricarboxylic acid compound. The polymer products have relatively high glass transition temperatures.

36 Claims, No Drawings

NOVEL POLYAMIDEIMIDE POLYMERS

FIELD OF THE INVENTION

This invention relates to a class of novel polyamideimide polymers characterized by the presence of both amide and imide linkages within the polymer chain. More particularly, the invention relates to a linear, alternating polymer in which moieties derived from a primary diamine alternate with either moieties derived from an aromatic tricarboxylic acid compound or moieties of a 1,6-diaza [4.4] spirodilactam.

BACKGROUND OF THE INVENTION

The class of polyimide polymers is known in the art, incorporating a variety of connecting structures around a central imide portion. A bismethylolimide is reacted with a dinitrile to produce a polyimide by Kurita et al, J. Polymer Sci: Polymer Chem. Ed., Vol. 16, pp. 779-789 (1978). Cjang et al, J. Polymer Sci.: Polymer Chem. Ed., Vol. 17, pp. 3255-3271 (1979) produce a polyimide by reaction of a diamine with a N,N'-(pyromettiloyl)diacetyl chloride. A poly(imidesulfone) is produced by the process disclosed by St. Clair et al, U.S. Pat. Nos. 4,489,027 and 4,398,021. Polyetherimide polymers are produced by White et al, U.S. Pat. No. 4,330,666, by using a hydroxypyridine or an aminocarboxylic acid as catalyst. Similar polyetherimide polymers are disclosed by Banucci et al, U.S. Pat. No. 4,314,047. Aliphatic polyimide resin is produced from a diamine and an aliphatic tetracarboxylic acid by Kojima et al, U.S. Pat. No. 4,362,863.

The class of polyamides is broadly known as a class of thermoplastic polymers having the property of relatively low temperature deformation which is normally associated with thermoplastics. However, in the case of polyimide polymers, fewer generalizations regarding polymer properties can be drawn. Certain of the polyimides are processed by methods conventionally employed with thermoplastics, e.g., extrusion or injection molding. Other polyimides are not easily processed by typical thermoplastic processing techniques. Certain of the polyimide polymers have good mechanical properties and flexibility but other polyimide polymers are deficient in these properties. Some polyimide polymers offer good solvent resistance to common solvents likely to be encountered whereas other polyimide polymers have a tendency to be at least partially soluble in solvents such as chloroform, aromatic hydrocarbons and the cresols. It would be of advantage to provide a class of polyimide polymers which exhibit good processability but also show good solvent resistance.

SUMMARY OF THE INVENTION

The present invention provides a linear, alternating terpolymer which contains amide as well as imide linkages within the polymer chain. More particularly, the invention provides a class of novel polyamideimide polymers wherein moieties corresponding to the non-amino portion of a primary diamine alternate with moieties of either an amide-imide derived from an aromatic tricarboxylic acid compound or a 1,6-diaza [4.4] spirodilactam. The invention additionally provides a method for the production of such polymers.

DESCRIPTION OF THE INVENTION

The novel polyamideimide polymers of the invention are the reaction product of a primary diamine, an aromatic tricarboxylic acid compound and a spirodilactam precursor. The spirodilactam precursor is a compound which, under the conditions of the process of the invention, reacts with the primary diamine reactant to produce the moiety of a [4.4] spirodilactam having spiro ring nitrogen atoms in the 1- and 6- spiro ring positions and connected through the nitrogen atoms to the moieties derived from the primary diamine. In one embodiment of the invention the spirodilactam precursor is a ketodiacid compound and in a second embodiment of the invention the spirodilactam precursor is an analogous spirodilactone.

In the modification wherein the spirodilactam precursor is a ketodicarboxylic acid compound, the acid compound is a ketodicarboxylic acid compound having two carbon atoms between the keto group and each carboxy function. In other terms, the ketodicarboxylic acid is a 4-oxoheptandioic acid compound. Although a variety of substituents in addition to the keto group and the carboxy functions are suitable for use in the process of the invention, the preferred 4-oxoheptanedioic acid compounds have up to 30 carbon atoms inclusive and are represented by the formula

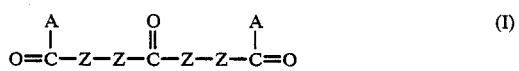

wherein A independently is hydroxy, alkoxy, preferably lower alkoxy of up to 4 carbon atoms inclusive, or halo, preferably the middle halogens chloro or bromo. The term Z independently is $>C(Z')_2$ in which Z' independently is hydrogen, lower alkyl, preferably methyl, halo, preferably the lower halogens fluoro or chloro, or aryl, preferably phenyl, or Z is such that adjacent Z groups form a ring system Z'' of from 5 to 7 ring atoms, up to two of which are heteroatoms selected from nitrogen, oxygen or sulfur with the remainder of the ring atom being carbon atoms, there being up to 15 carbon atoms in each Z'', two of which form a bridge between the carbon atoms connected by the adjacent Z groups. When adjacent Z groups taken together form a ring system, Z'' is otherwise hydrocarbyl containing only atoms of carbon and hydrogen besides any heteroatoms present or is substituted hydrocarbyl additionally containing other atoms present in the form of monovalent, inert, carbon atom substituents, e.g., halo atoms, preferably the middle halogens chloro or bromo.

In one embodiment employing the ketodicarboxylic acid compound as the spirodilactam precursor, each Z moiety is $>C(Z')_2$ and the ketodiacid compound is an acyclic 4-oxoheptanedioic acid compound, i.e., a 4-oxoheptanedioic acid compound free from fused, cyclic substituents. Such 4-oxoheptanedioic acid compounds are represented by the formula

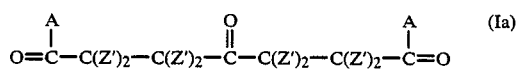

wherein A and Z' have the previously stated meanings. These 4-oxoheptanedioic acid compounds include 4-oxoheptanedioic acid, dimethyl 4-oxoheptanedioic, 2,6-dimethyl-4-oxoheptanedioic acid, 2,3,5,6-tetramethyl-4-oxoheptandioyl chloride, di-n-propyl 2,6-di-n-butyl-4-oxoheptandioyl chloride, di-n-propyl 2,6-di-n-butyl-4-oxoheptanedioate and 7-carbomethoxy-3,3,5,5-tetramethyl-4-oxoheptanoic acid. The preferred compounds of formula Ia are those wherein each Z' is hydrogen or methyl, especially hydrogen, and each A is hydroxy or alkoxy, especially hydroxy.

These ketodiacid compounds are known compounds or are prepared by known methods. Certain of the esters of formula Ia, i.e., the compounds wherein each A is alkoxy and at least one Z' on each carbon atom adjacent to a carboxy function is hydrogen, are produced by reacting formaldehyde with an α,β-ethylenically unsaturated carboxylic acid ester such as methyl acrylate or ethyl methacrylate. The reaction is conducted in the presence of a catalyst system which comprises a thiazolium salt and a tertiary amine and produces the 4-oxoheptanedioate compound in good yield. This process is described and claimed in greater detail in copending U.S. patent application Ser. No. 171,999 filed Mar. 23, 1988, incorporated herein by reference. Conversion of the esters thereby obtained to corresponding free acids or acid halides is by conventional methods as is the general interconversion of the acids, esters or acid halides of formula Ia.

In a second embodiment of the ketodiacid as the spirodilactam precursor, the 4-oxoheptanedioic acid compound is cyclic, that is, incorporates cyclic substituents between the keto group and the carboxy functions, i.e., the adjacent Z moieties form a cyclic ring system Z''. Such ketodicarboxylic acid compounds are represeated by the formula

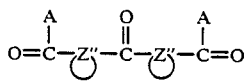  (Ib)

wherein A and Z'' have the previously stated meanings. Illustrative of such cyclic ketodiacid compounds are di(2-carboxycyclohexyl) ketone, di(2-carboxyphenyl) ketone, di(2-carbopropoxycyclo-4-pentenyl) ketone, di(2-chlorocarbonylphenyl) ketone, di(2-carboxypyridyl) ketone, 2-carboxyphenyl N-methyl-3-carboxy-2-pyrryl ketone, di(3-carboethoxy)-2-morpholyl ketone and di(2-carbomethoxy-3-chlorophenyl) ketone. The preferred ketodiacid compounds with cyclic substituents are those compounds of from 5 to 6 ring atoms and up to 1 nitrogen heteroatom. Most preferred as a cyclic substituent is benzo.

The cyclic ketodiacid compounds of formula Ib are known compounds or are produced by known methods such as the method of U.S. Pat. No. 1,999,181 or the method of Cava et al, J. Am. Chem. Soc., 20, 6022 (1955), incorporated herein by reference.

In yet another modification of the ketodiacid compound as the spirodilactam precursor, the ketodiacid compound incorporates one cyclic substituent with the remainder of the Z moieties being acyclic, i.e., the compounds represented by the formula

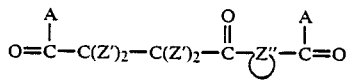  (Ic)

wherein A, Z' and Z'' have the previously stated meanings. Such ketodiacids of one cyclic moiety are illustrated by 3-(2-carboxybenzoyl)propionic acid, 3-(3-carboethoxy-2-pyridyloyl)-2-ethylpropionic acid, ethyl 3(2-carboxy-4-methylbenzoyl)propionate and 3-(2-carboxybenzoyl)butyrl chloride. The ketodiacids of formula Ic are known compounds or are produced by known methods. For example, 2-carbomethoxybenzaldehyde reacts with methyl acrylate according to the general teachings of copending U.S. patent application Ser. No. 171,999 filed Mar. 23, 1988, to produce methyl 3-(2-carbomethoxybenzoyl)propionate.

in a second modification of the process of the invention the spirodilactam precursor is a 1,6-dioxaspiro[4.4-]nonane-2,7-dione compound wherein the spirodilactone ring system is substituted with hydrogen, alkyl, halo or aryl, or the ring system incorporates fused ring substituents which include the 3- and 4- spiro ring positions and/or the 8- and 9- spiro ring positions. One class of such 1,6-dioxa [4.4] spirodilactones is represented by the formula

  (II)

wherein Z has the previously stated meaning.

In the modification of these spirodilactam precursors wherein each Z is acyclic, the spirodilactone is represented by the formula

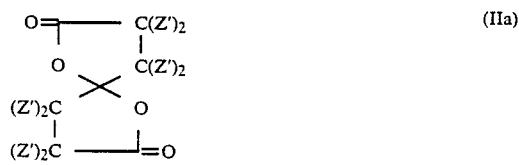  (IIa)

wherein Z' has the previously stated meaning. Illustrative of such spirodilactones are 1,6-dioxaspiro[4.4]nonane-2,7-dione, 3,8-dimethyl-1,6-dioxaspiro[4.4]nonane-2,7-dione, 3,4,8,9-tetramethyl-1,6-dioxaspiro[4.4]nonane-2,7-dione, 3,3,8,8-tetramethyl-1,6-dioxaspiro[4.4-]nonane-2,7-dione, 3,3,4,4,8,8,9,9-octamethyl-1,6-diorospiro[4 4]nonane-2,7-dione and 3,4,8,9-tetrafluoro-1,6-dioxaspiro[4.4]nonane-2,7-dione. Preferred spirodilactones of the formula IIa are those wherein at least one Z' of each Z'-substituted carbon atom is hydrogen and further preferred are the spirodilactones of formula IIa wherein each Z'' is hydrogen. The compounds of formula IIa are known compounds or are produced by known methods such as by the process of Pariza et al, Synthetic Communications, Vol. 13(3), pp. 243-254 (1983), incorporated herein by reference.

In the embodiment of the invention wherein the spirodilactone of formula II incorporates one cyclic substituent fused to each spiro ring, the spirodilactones are represented by the formula

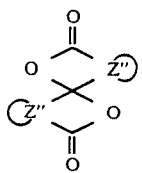  (IIb)

wherein Z'' has the previously stated meaning. Typical compounds of formula IIb are 3,4,8,9-dibenzo-1,6-dioxaspiro[4.4]nonane-2,7-dione, 3,4,8,9-dibenzo-1,6-dioxaspiro[4.4]nonane-2,7-dione, 3,4,8,9-di(cyclopentano)-1,6- dioxaspiro[4.4]nonane-2,7-dione, 3,4,8,9-di(4-methylbenzo)-1,6-dioxaspiro[4.4]nonane-2,7-dione and 3,4,8,9-di(pyrido)-1,6-dioxaspiro[4.4]nonane-2,7-dione. These compounds are known compounds or are produced by known methods, for example, the process of the above Cava et al article or the process of U.S. Pat. No. 1,999,181.

In the embodiment where the spirodilactam precursor is a spirodilactone incorporating a fused cyclic substituent in one of the spiro rings but the other spiro ring is free of fused cyclic substituents, the spirodilactones are represented by the formula

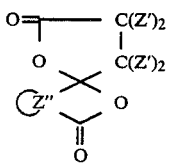   (IIc)

wherein Z' and Z" have the previously stated meanings. Such spirodilactones are illustrated by 3-methyl-8,9-benzo-1,6-dioxaspiro[4.4]nonane-2,7-dione, 3,4-benzo-1,6-dioxaspiro[4.4]nonane-2,7-dione and 3,3,4,4-tetramethyl-8,9-(2-morpholo)-1,6-dioxaspiro[4.4]nonane-2,7-dione. The spirodilactones of the above formula IIc are known compounds or are produced by known methods such as the dehydration of the corresponding ketodiacid compound. By way of specific illustration, 3,4-benzo-1,6-dioxaspiro[4.4]nonane-2,7-dione is produced by dehydration of 3-(2-carboxybenzoyl)propionic acid through application of heat.

In general, the preferred spirodilactones for use as spirodilactam precursors are hydrocarbon except for the oxygen atoms of the lactone moieties, particularly those spirodilactones which are free from fused cyclic substituents (formula IIa) or those which have a fused cyclic substituent on each of the spiro rings (formula IIb). The spirodilactone 1,6-dioxaspiro[4.4]nonane-2,7-dione is an especially preferred among members of the former class whereas 3,4,8,9-dibenzo-1,6-dioxaspiro[4.4]nonane-2,7-dione is an especially preferred member of the latter class.

The spirodilactam precursor is reacted, according to the process of the invention, with an aromatic tricarboxylic acid compound and a primary diamine. Primary diamines are those organic compounds which have two primary amino groups, i.e., —NH₂ groups, as carbon atom substituents. While reaction to produce the polyamideimide polymers of the invention will take place with a variety of primary diamines of varying structure, best results are obtained in the process of the invention of the two amino groups are not located on adjacent carbon atoms, that is, at least three atoms separate the two primary amino groups. One such class of primary diamines comprises diamines of up to 30 carbon atoms inclusive which are represented by the formula

H₂N—R—NH₂   (III)

wherein R is a divalent organic radical of up to 30 carbon atoms inclusive and is divalent alkylene or divalent arylene of from 1 to 2 aromatic rings inclusive which, when two aromatic rings are present incorporates rings which are fused or which are connected by a moiety X wherein X is a direct valence bond, alkylene of up to 8 carbon atoms inclusive, oxy, thio, sulfonyl, carbonyl, dioxyphenylene, i.e.

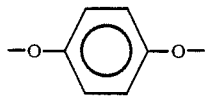

2,2-di(oxyphenyl)propane, i.e.

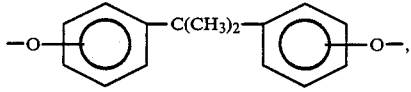

di(oxyphenyl)sulfone, i.e.,

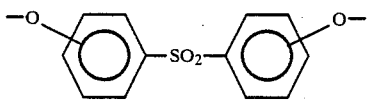

or dioxydiphenylene, i.e.,

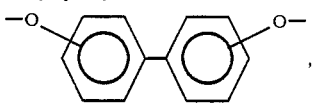

with the proviso that the two amino groups are not located on adjacent atoms. R is preferably hydrocarbyl containing only atoms of carbon and hydrogen besides the additional atoms of divalent linking groups but may also be substituted hydrocarbyl containing other atoms such as halogen, preferably middle halogen, as inert monovalent carbon atom substituents.

Illustrative of the alkylene-containing primary diamines of formula III are trimethylenediamine, tetramethylenediamine, hexamethylenediamine, octamethylenediamine, 1,7-diamino-4-methyloctane, 1,4-diaminocyclohexane, di(4-amino-cyclohexyl)methane, dodecamethylenediamine and 1,6-diamino-3-4-diethylhexane. Arylene diamines of the above formula III include 1,4-phenylenediamine, 2,4-toluenediamine, 4,4'-diaminobiphenyl, 1,5-diaminonaphthalene, di(3-aminophenyl) ether, di(4-aminophenyl)methane, 2,2-di(3-amino-4-methylphenyl)propane, di(4-amino-2-ethylphenyl) sulfone, di(3-amino-4-bromophenyl) ketone, di(2-aminophenyl) sulfide, 1,3-di(3-aminophenyloxy)benzene, 2,2-di[4-(4-aminophenyloxy)phenyl)]propane and 4,4'-di(4-aminophenyloxy)biphenyl. The preferred primary diamines of the above formula III are those wherein R is divalent arylene and which are otherwise hydrocarbyl except for any additional atoms of divalent linking groups. Particularly preferred are the di(aminophenyl)alkanes, especially the di(4-aminophenyl)alkanes such as di(4-aminophenyl)methane.

In the reaction of the invention the spirodilactam precursor and the primary diamine react with an aromatic tricarboxylic acid compound which will suitably have two of the carboxy functions on adjacent carbon atoms of the same aromatic ring as free carboxyl groups (—CO₂H groups) or together as an anhydride moiety (—CO—O—CO—) and the third carboxy function as a free carboxyl group on the same or on a different aromatic ring, but preferably on a carbon atom which is not adjacent to one of the two carbon atoms on which the other carboxy functions are substituted. A preferred class of aromatic tricarboxylic acid compounds has up to 30 carbon atoms in each acid compound and up to 3 aromatic rings, inclusive, and is represented by the formula

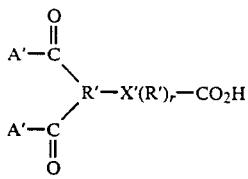

wherein X' is X, A' is hydroxyl or the two A' groups taken together are oxy linking the two carbons to which the A' groups are attached, R' is aromatic of up to 15 carbon atoms and from 1 to 2 aromatic rings and r is 0 or 1. R' is preferably hydrocarbyl but may be substituted hydrocarbyl containing additional atoms as inert carbon atom substituents, e.g., halogen atoms and preferably the middle halogens.

Illustrative of the aromatic tricarboxylic acid compounds which are useful in the process of the invention are 1,2,4-benzenetricarboxylic acid (trimellitic acid), trimellitic anhydride, 1,2,4'-tricarboxybiphenyl, 4-(4-carboxyphenyloxy)phthalic acid, 1,2,5-naphthalene-tricarboxylic acid, 4-(4-carboxyphenylthio)phthalic anhydride, 2-(3,4-dicarboxyphenyl)-2-(4-carboxyphenyl)-propane, 4-[4-(4-carboxyphenyloxy)phenyloxy]phthalic acid, 4-(3-carboxybenzoyl)phthalic anhydride and 4-[1-(4-carboxynaphthyl)phthalic anhydride. In general, hydrocarbon R' groups are preferred as the reactant of formula IV, and particularly preferred are those where r is 0 and X' is a direct valence bond. Such aromatic tricarboxylic acid compounds of one aromatic ring give best results, particularly trimellitic acid or trimellitic anhydride.

The reaction of the spirodilactam precursor, the primary diamine and the tricarboxylic acid compound is conducted in the liquid phase in the presence of an inert reaction diluent. Diluents which are liquid at reaction conditions and in which the reactants are at least partially soluble at reaction temperature are satisfactory. Suitable diluents includes the N-alkylamides such as N,N-dimethylformamide, N,N-dimethylacetamide and N-methyl-2-pyrrolidone, phenols such as phenol and m-cresol, sulfur-containing diluents such as dimethylsulfoxide and sulfolane and glycols such as ethylene glycol and tetraethylene glycol.

The polymerization is conducted by contacting the reactants in a suitable reactor under polymerization conditions and maintaining reactant contact by conventional methods such as shaking or stirring. The relative properties of the reactants may vary with: certain limits and the properties of the resulting polymer will vary accordingly. The molar ratio of spirodilactam precursor to tricarboxylic acid compound is suitably from about 95:5 to about 5:95 but preferably will be from about 4:1 to about 1:4. As the primary diamine reacts with both the spirodilactam precursor and the tricarboxylic acid compound, the molar quantity of the primary diamine should preferably be about equal to the total molar quantity of the other two reactants. Molar ratios of primary diamine to total spirodilactam precursor plus tricarboxylic acid compound from about 5:1 to about 1:5 are satisfactory but molar ratios of from about 2:1 to about 1:2 are preferred.

The polymerization is conducted at an elevated temperature. Reaction temperatures from about 80° C. to about 250° C. are suitable with preferred reaction temperatures being from about 120° C. to about 200° C. A suitable reaction pressure is one which will maintain the reaction mixture in a liquid phase. Such pressures are typically up to about 20 atmospheres but more often are from about 0.8 atmospheres to about 10 atmospheres. During reaction, any water present or formed is preferably removed by conventional procedures such as selective extraction or distillation, preferably azeotropic distillation with a portion of the reaction diluent or with a second reaction diluent with which water forms an azetrope, e.g., toluene or ethylbenzene. Subsequent to reaction, the polymer product is recovered by conventional methods such as solvent removal, extraction or precipitation.

The polymer product is a polyamideimide containing amide linkages as well as imide linkages. The amide linkages result from spirodilactam moiety formation or from reaction of the single carboxy function of the aromatic carboxylic acid compound with the primary diamine. The imide linkage results from the reaction of the two adjacent carboxy functions of the aromatic tricarboxylic acid compound with the primary amine. The polymer product thus contains moieties of the non-amino portion of a primary diamine alternating with either (1) a 1,6.diaza [4.4] spirodilactam moiety connected to the remainder of the polymer chain through the spiro ring nitrogen atoms or (2) a moiety of the aromatic tricarboxylic acid compound derived by the loss of hydroxyl groups or anhydride oxygen equivalent. In terms of the reactants as depicted above (formulas I or II, III and IV) the polymer products are represented by the repeating formula V

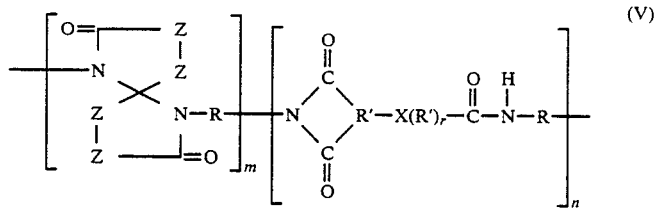

wherein Z, R, R', X and r have the previously stated meaning and the ratio of m:n is preferably from about 4:1 to about 1:4. Of particular interest are the polymers of formula V having a molecular weight from about 10,000 to about 100,000.

The nomenclature of the polymer products of the formula V is not easily determined because of the complexity thereof, but the identity of the products will be apparent from the above discussion of the reactants and consideration of the formula for the products as depicted above. Illustrative of such products is the polymer illustratively produced from 4-oxoheptanedioic acid or 1,6-dioxaspiro[4.4]nonane-2,7-dione, di(4-aminophenyl)methane and trimellitic anhydride, the polymer product produced from 2,3,5,6-tetramethyl-4-oxoheptanedioic acid or 3,4,8,9-tetramethyl-1,6-dioxaspiro[4.4]nonaae-2,7-dione, p-phenylenediamine and 4-(4-carboxyphenyl)phthalic acid and the polymer illustratively produced from di(2-carboxyphenyl)ketone or 3,4,8,9-dibenzo-1,6-dioxaspiro[4.4]nonane-2,7-dione, 2,2-di(4-aminophenyl)propane and 4-(3-carboxyphenyloxy)phthalic anhydride. Preferred polymer products are those of the above formula V wherein Z is $>C(Z')_2$ in which $Z'$ is hydrogen or methyl, R is divalent arylene, r is 0 and R' is a direct valence bond.

The polymer product is a thermoplastic polymer of relatively high glass transition temperature, typically over 200° C. and often over 250° C. The polymer product is processed by the conventional techniques associated with thermoplastics such as injection molding and extrusion into sheets, films, fibers and shaped articles which demonstrate good resistance to common solvents. Because of the relatively high glass transition temperatures exhibited by the polymers they are useful as engineering thermoplastics where elevated temperatures are likely to be encountered. Such applications include the production of containers for food and drink and base materials for electrical and electronic applications.

The invention is further illustrated by the following Illustrative Embodiment which should not be construed as limiting the invention.

ILLUSTRATIVE EMBODIMENT

A mixture of 17.4 g (0.1 mole) of 4-oxoheptanedioic acid, 19.2 g (0.1 mole) of trimellitic anhydride, 39.6 g (0.2 mole) of di(4-aminophenyl)methane, 2 ml of nitric acid, 60 ml of ethylbenzene and 200 ml of N-methyl-2-pyrrolidone was heated, while being stirred, to 160°–170° C. and the water present or formed was removed by azeotropic distillation. When the water removal was complete the temperature of the mixture was raised to 180°–190° C. and maintained at that temperature for 12 hours. After cooling, the resulting mixture was poured into methanol. The polymer product was recovered by filtration, washed with methanol and dried in a vacuum oven at 70° C. for 12 hours. The polymer product had a glass transition temperature of 273° C. The nuclear magnetic resonance spectra were consistent with a polymer having diphenylenemethane units alternating with units of a 1,6-diaza[4,4] spirodilactam or units of

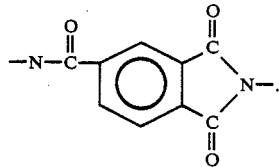

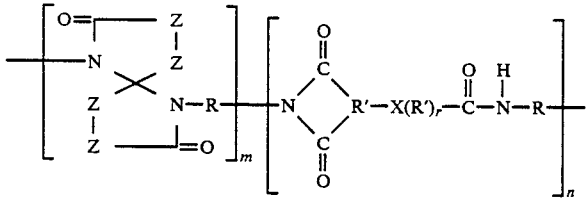

What is claimed is:

1. The process of producing a polyamideimide polymer by contacting under polymerization conditions
   (a) a spirodilactam precursor of up to 30 carbon atoms inclusive selected from (1) 4-oxoheptanedioic acid compounds or (2) 1,6-dioxa-[4.4]spirodilactone,
   (b) a primary diamine of up to 30 carton atoms wherein the amino groups are not located on adjacent carbon atoms, and
   (c) an aromatic tricarboxylic acid compound of up to 30 carbon atoms and up to 3 aromatic rings, inclusive, having two of the acid groups located on adjacent carbon atoms of the same aromatic ring as free carboxyl groups or together as an anhydride moiety.

2. The process of claim 1 wherein the tricarboxylic acid compound is represented by the formula

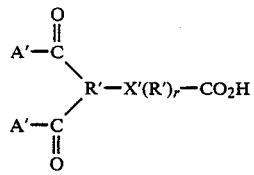

wherein R' is aromatic of from 1 to 2 aromatic rings, A' independently is hydroxyl or taken together the A' groups are oxy linking the two carbons to which the A' groups are attached, r is 0 or 1 and X' is a direct valence bond or X' represents alkylene of up to 8 carbon atoms inclusive, oxy, thio, sulfonyl, dioxyphenylene, 2,2-di(oxyphenyl)propane, di(oxyphenyl) sulfone or dioxydiphenylene.

3. The process of claim 2 wherein the primary diamine is represented by the formula $$H_2N-R-NH_2$$

wherein R is divalent alkylene or divalent arylene of from 1 to 2 aromatic rings, inclusive, which when two rings are present are fused or are joined by X, and X is X'.

4. The process of claim 3 wherein the spirodilactam precursor is selected from the 4-oxoheptanedioic acid compound of the formula

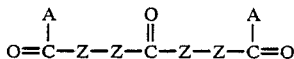

or the spirodilactone of the formula

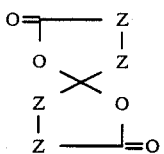

wherein A independently is hydroxy, lower alkoxy or middle halo and Z independently is $>C(Z')_2$ in which $Z'$ independently is hydrogen, lower alkyl, aryl, or lower halo or Z is such that two adjacent Z moieties form a cyclic ring system $Z''$ of from 5 to 7 ring atoms, up to two of which are heteroatoms selected from nitrogen, oxygen or sulfur with the remainder of the ring atoms being carbon atoms, there being up to 15 carbon atoms inclusive in each $Z''$, two of which form a bridge between the carbon atoms joined by the adjacent Z moieties.

5. The process of claim 4 wherein the spirodilactam precursor is the 4-oxoheptanedioic acid compound.

6. The process of claim 5 wherein each Z is $>C(Z')_2$ in which $Z'$ is hydrogen or methyl.

7. The process of claim 6 wherein the primary diamine is di(aminophenyl)alkane.

8. The process of claim 7 wherein, within the aromatic tricarboxylic acid compound, r is 0 and X' is a direct valence bond.

9. The process of claim 8 wherein Z' is hydrogen.

10. The process of claim 9 wherein the primary diamine is di(4-aminophenyl)methane.

11. The process of claim 10 wherein the aromatic tricarboxylic acid compound is trimellitic anhydride.

12. The process of claim 4 wherein the spirodilactam precursor is the spirodilactone.

13. The process of claim 12 wherein Z is $>C(Z')_2$ in which Z is hydrogen or methyl.

14. The process of claim 13 wherein the primary diamine is di(aminomethyl)alkane.

15. The process of claim 14 wherein the aromatic tricarboxylic acid compound is mellitic acid or mellitic anhydride.

16. The process of claim 15 wherein Z' is hydrogen.

17. The process of claim 16 wherein the primary diamine is di(4-aminophenyl)methane.

18. The process of claim 12 wherein adjacent Z moieties are Z".

19. The process of claim 18 wherein each Z" is benzo.

20. The process of claim 19 wherein the aromatic tricarboxylic acid compound is trimellitic acid or trimellitic anhydride.

21. The process of claim 20 wherein the primary diamine is di(4-aminophenyl)methane.

22. The process of claim 20 wherein the primary diamine is 2,2-di(4-aminophenyl)propane.

23. The polyamideimide polymer, having imide and amide linkages, of a primary diamine of up to 30 carbon atoms alternating with moieties of a 1,6-diaza[4.4]-spirodilactam of up to 30 carbon atoms connected to the remainder of the polymer chain through the spiro ring nitrogen atoms and moieties derived from an aromatic tricarboxylic acid compound of up to 30 carbon atoms by loss of hydroxyls or anhydride oxygen equivalent from said acid compound.

24. The polymer of claim 23 represented by the repeating formula wherein Z independently is $\geq C(Z')_2$ in which Z' independently is hydrogen, lower alkyl or lower halo, or Z is such that two adjacent Z moieties form a ring system Z" of from 5 to 7 ring atoms up to two of which are heteroatoms selected from nitrogen, oxygen or sulfur with the remainder of the ring atoms being carbon atoms, there being up to 15 carbon atoms inclusive in each Z", two of which form a bridge between the carbon atoms connected by the adjacent Z moieties; R has up to 30 carbon atoms inclusive and is a divalent alkylene or divalent arylene of from 1 to 2 aromatic rings which, when two aromatic rings are present are fused or joined by X; X and X' each is a direct valence bond or X and X' each is alkylene of up to 8 carbon atoms inclusive, oxy, thio, sulfonyl, carbonyl, dioxyphenylene, 2,2-di(oxyphenyl)propane, di(oxyphenyl) sulfone or dioxydiphenylene; R, is aromatic of up to 15 carbon atoms and from 1 to 2 aromatic rings, r to 0 or 1 and the ratio of m:n is from about 95:5 to about 5:95.

25. The polymer of claim 23 wherein r is 0 and X' is a direct valence bond.

26. The polymer of claim 24 or 25 wherein Z is $>C(Z')_2$ in which Z' is hydrogen or methyl.

27. The polymer of claim 25 wherein R is di(phenylene)alkane.

28. The polymer of claim 26 wherein Z' is hydrogen.

29. The polymer of claim 27 wherein di(phenylene)alkane is di(4-phenylene)methane.

30. The polymer of claim 24 or 25 wherein adjacent 2 moieties are Z".

31. The polymer of claim 29 wherein Z" is benzo.

32. The polymer of claim 30 wherein R is di(phenylene)methane.

33. The polymer of claim 31 wherein the di(phenylene)alkane is di(4-phenylene)methane.

34. The polymer of claim 31 wherein the di(phenylene)alkane is 2,2-di(4-phenylene)propane.

35. The polymer according to claim 24 wherein the ratio of m:n is from about 4:1 to about 1:4.

36. The process according to claim 1 wherein the molar ratio of diamine to spirodilactam precursor plus tricarboxylic acid is from about 5:1 to about 1:5.

* * * * *